(12) United States Patent
Baer et al.

(10) Patent No.: US 7,124,591 B2
(45) Date of Patent: Oct. 24, 2006

(54) METHOD FOR OPERATING A GAS TURBINE

(75) Inventors: Joan Mae Baer, Casselberry, FL (US); Walter Ray Laster, Oviedo, FL (US); Douglas Allen Keller, Oviedo, FL (US)

(73) Assignee: Siemens Power Generation, Inc., Orlando, FL (US)

( * ) Notice: Subject to any disclaimer, the term of this patent is extended or adjusted under 35 U.S.C. 154(b) by 195 days.

(21) Appl. No.: 10/754,195

(22) Filed: Jan. 9, 2004

(65) Prior Publication Data

US 2005/0150229 A1   Jul. 14, 2005

(51) Int. Cl.
F02C 6/08 (2006.01)
F02C 6/18 (2006.01)
F02C 7/26 (2006.01)

(52) U.S. Cl. ............... 60/786; 60/782; 60/794; 60/795

(58) Field of Classification Search ......... 60/39.23, 60/39.5, 795, 794, 782, 786
See application file for complete search history.

(56) References Cited

U.S. PATENT DOCUMENTS

| | | | |
|---|---|---|---|
| 2,257,982 A * | 10/1941 | Seippel | 60/39.17 |
| 3,049,869 A * | 8/1962 | Grenoble | 60/772 |
| 3,070,131 A * | 12/1962 | Wheatley | 60/39.23 |
| 3,344,606 A * | 10/1967 | Abernethy | 60/795 |
| 3,358,450 A | 12/1967 | Schroedter et al. | |
| 3,973,391 A | 8/1976 | Reed et al. | |
| 3,974,645 A | 8/1976 | Smith | |
| 3,978,658 A * | 9/1976 | Forbes et al. | 60/39.27 |
| 4,028,884 A | 6/1977 | Martz et al. | |
| 4,060,979 A * | 12/1977 | Elsaesser et al. | 60/794 |
| 4,083,181 A | 4/1978 | Adamson | |
| 4,163,365 A | 8/1979 | Frutschi | |
| 4,282,708 A | 8/1981 | Kuribayashi et al. | |
| 4,437,313 A | 3/1984 | Taber et al. | |
| 4,519,207 A | 5/1985 | Okabe et al. | |
| 4,561,254 A | 12/1985 | Martens et al. | |
| 4,598,551 A | 7/1986 | Dimitroff, Jr. et al. | |
| 4,815,928 A * | 3/1989 | Pineo et al. | 60/794 |
| 4,843,823 A | 7/1989 | Freedman | |
| 4,907,406 A * | 3/1990 | Kirikami et al. | 60/794 |
| 5,029,443 A | 7/1991 | Hauser | |
| 5,042,246 A | 8/1991 | Moore et al. | |
| 5,095,706 A | 3/1992 | Saito et al. | |
| 5,309,709 A | 5/1994 | Cederwall et al. | |
| 5,412,936 A | 5/1995 | Lee et al. | |
| 5,473,898 A | 12/1995 | Briesch | |
| 5,525,053 A | 6/1996 | Shelor | |
| 5,737,912 A | 4/1998 | Krakowitzer | |
| 6,141,952 A | 11/2000 | Bachmann et al. | |
| 6,145,295 A | 11/2000 | Donovan et al. | |
| 6,269,625 B1 | 8/2001 | Dibble et al. | |

* cited by examiner

*Primary Examiner*—Ted Kim

(57) ABSTRACT

A gas turbine includes a compressor, a combustor, a turbine, and a flow path diverting an excess portion of the compressed air produced by the compressor around the turbine. The flow path conducts the excess portion into a turbine exhaust gas flow producing a cooled exhaust gas. A method of operating the gas turbine includes opening an inlet guide vane of the compressor to allow the compressor to produce an increased volume of compressed air. The increased volume exceeds a volume of compressed air needed to support combustion. An excess portion of the compressed air is directed into the exhaust gas to produce a cooled exhaust. In a combined cycle power plant, the cooled exhaust from the gas turbine may be used to warm a steam turbine portion to a desired temperature while allowing operation of the gas turbine at a power level that produces exhaust gas at a temperature higher than the desired temperature.

19 Claims, 2 Drawing Sheets

A  GT#1 Starting Motor On
B  GT#1 Flame Ignited
C  GT#1 Synchronized & Ramped to 25% Load
D  GT#1 Ramped to 50% Load
E  First Steam to Steam Turbine
F  GT#2 Starting Motor On
G  GT#1 Flame Ignited
H  GT#2 Synchronized & Ramped to 25% Load
I  GT#1 & CT#2 Ramped to Base Load
J  GT#1 & CT#2 At Base Load
K  Steam Turbine Synchronized
L  Begin St Loading Ramp
M  GT#1, GT#2 & ST At Base Load

METHOD FOR OPERATING A GAS TURBINE

FIELD OF THE INVENTION

This invention relates generally to the field of power generation, and more particularly, to operation of a gas turbine.

BACKGROUND OF THE INVENTION

Combined cycle power plants are well known in the art. A combined cycle power plant includes both a gas turbine-based topping cycle and a steam turbine or a steam ranking bottoming cycle that is driven by heat in the exhaust of the gas turbine. During startup of a combined cycle power plant from cold start conditions, the gas turbine portion of the plant necessarily must be started before the steam turbine portion. The term cold start is a relative term but is used herein to refer generally to conditions where the plant has not been operated for an extended time period, such as 48 hours, and where the boiler is not pressurized. During startup of a gas turbine having a single shaft-constant speed arrangement, there is a relatively rapid increase in the flow rate of the exhaust from the gas turbine as it accelerates to operating speed. Thereafter, the exhaust gas flow rate remains relatively constant except for the effect of compressor inlet guide vane modulation. After the gas turbine reaches operating speed, the temperature of the exhaust gas gradually increases as the firing temperature of the gas turbine is increased up to the level required to produce the desired power output. However, the rate of increase in load and temperature of the gas turbine exhaust is constrained by thermal transient stress limits in the components of the steam turbine and the balance of plant, including the heat recovery steam generator (HRSG) that is exposed to the hot exhaust gas stream. During startup, the startup temperature of the gas turbine exhaust is regulated to gradually heat and pressurize the HRSG. In a typical combined cycle plant, the gas turbine may be initially limited to about 20–30% rated power in order to maintain the exhaust at a sufficiently low temperature to maintain stresses within acceptable levels in the cold HRSG.

The necessity to gradually heat a combined cycle power plant during startup reduces the overall efficiency of the plant and reduces the plant's ability to respond to rapidly changing power requirements. Furthermore, the operation of the gas turbine portion of the plant at less than full rated load may result in a level of gaseous emissions that exceeds regulatory or Original Equipment Manufacturers base load contractual requirements. In particular, it is known that the level of carbon monoxide (CO) produced in a gas turbine engine will increase as the firing temperature is decreased during part-load operation. Operation of the gas turbine portion of a combined cycle power plant at 20–50% rated load during the startup phase will often place the plant outside of emissions compliance limits. Not only does such operation have an undesirable impact on the local environment, but it may also have a negative financial impact on the owner or operator of the plant, since a plant revenue stream may be adversely impacted by operation outside of regulatory compliance limits. Accordingly, there is a strong incentive to reduce the startup time for a combined cycle power plant and to reduce the operation of the plant at non-compliance emissions points.

BRIEF DESCRIPTION OF THE DRAWINGS

The invention will be more apparent from the following description in view of the drawings that show.

DETAILED DESCRIPTION OF THE INVENTION

Figure 1:
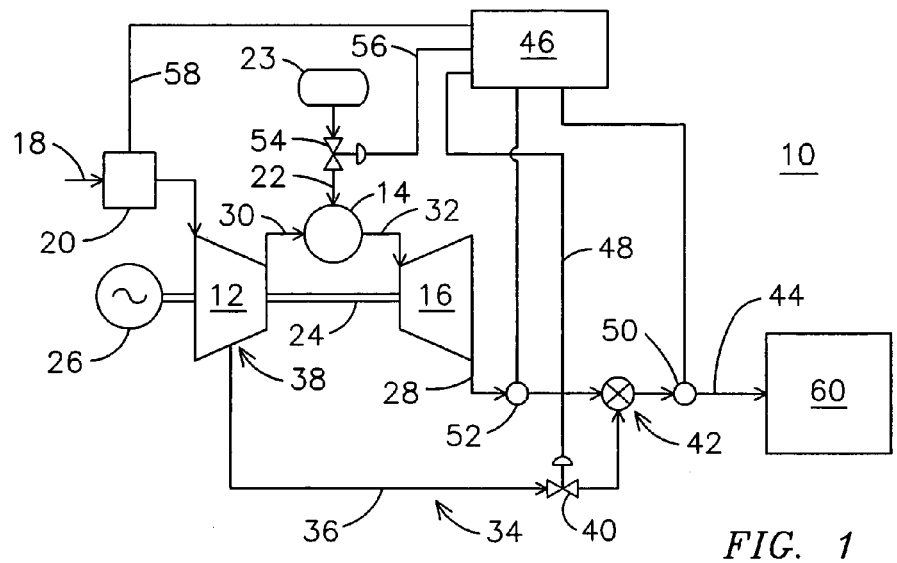
FIG. 1 is a functional diagram of a combined cycle power plant having a gas turbine having a flow path conducting compressed air from an inlet upstream of the combustor to an outlet downstream of the turbine.

FIG. 1 is a functional diagram of a gas turbine 10. Major component of the gas turbine 10 include a compressor 12, a combustor 14 and a turbine 16. The gas turbine 10 receives ambient air 18 through a set of inlet guide vanes 20. The ambient air 18 is compressed by compressor 12 and delivered to combustor 14 where it is used to combust a flow of fuel 22 from a fuel source 23 to produce hot combustion gas 32. The hot combustion gas 32 is delivered to turbine 16 where it is expanded to develop shaft power. Typically, the turbine 16 and compressor 12 are connected to a common shaft 24, which in turn may be connected to an electrical generator 26. In a combined cycle plant, the exhaust gas 28 produced by the gas turbine 10 may be directed to an HRSG (not shown) of a steam turbine portion 60 of the plant. The aforementioned components of the gas turbine 10 are fairly typical of those found in the prior art, and other known variations of these components and related components may be used in other embodiments of the present invention.

In a conventional startup procedure, the loading on the gas turbine 10 may be limited to 20% to 50% of a rated base load to insure that a sufficiently low exhaust temperature is maintained to avoid overheating a downstream HRSG. However, partial load operation may increase pollutant emission due to a decreased firing temperature inherent when operating at less than full load. In addition, at low loads, stability of the flame may be difficult to achieve as a result of the decreased firing temperature and a comparatively lower air to fuel ratio (AFR) as less fuel is provided per the same air volume that is provided at higher loads. To improve stability of the flame during start up, the inlet guide vanes 20 are typically closed to reduce a volume of ambient air 18 introduced into the compressor 12. Consequently, a relatively smaller volume of a combustion portion 30 of compressed air is supplied by the compressor 12 compared to a volume of the combustion portion 30 exiting the compressor 12 when the vanes 20 are open. As a result, the AFR in the combustor 14 may be lowered, provided a volume of fuel 23 supplied to the combustor 14 is maintained. Therefore, in conventional gas turbines, the inlet guide vanes 20 are closed during startup to provide a lower AFR and achieve flame stability at partial loads. As a load on the gas turbine 10 is increased (for example, according to a desired loading schedule for gas turbine startup in a combined cycle plant), the inlet guide vanes 20 may be gradually opened until reaching a fully open position at a predetermined power level.

Contrary to the conventional technique of closing the inlet guide vanes during a startup period, the inventors have developed an innovative gas turbine operating method that includes opening, instead of closing, the inlet guide vanes during startup. Opening the inlet guide vanes has the advantage of increasing the temperature of air exiting the compressor, and consequently, a firing temperature in the combustor to achieve flame stability and reduced CO formation. However, with the inlet guide vanes being opened, a greater volume of compressed air will be provided by the compressor than is a volume of compressed air needed to support combustion in the combustor. An excess volume of compressed air, comprising, for example, a portion of the greater volume of compressed air exceeding the volume of compressed air needed to support combustion, is extracted upstream of the combustor and directed downstream of the turbine to combine with the turbine exhaust. Accordingly, an overall exhaust temperature of the gas turbine may be reduced by addition of excess air having a temperature relatively lower than a temperature of the exhaust gas exiting the turbine. As a result, the firing temperature (power level) may be maintained at a higher temperature (power) because the exhaust from the turbine is cooled, for example, to a temperature low enough to prevent damage to a downstream HRSG. Advantageously, the gas turbine 10 may be operated at a power level sufficiently high to enable satisfying an emissions regulation by combining the excess compressed air with the exhaust gas. In addition, the gas turbine 10 may be scheduled to operate at a higher load relatively sooner than is possible in a conventional combined cycle plant.

To accomplish the foregoing, the gas turbine 10 further includes a bypass flow path 34 conducting an excess portion 36 of the compressed air from an inlet 38 upstream of the combustor 14 to an outlet 42 downstream of the turbine 16. In one embodiment, the excess portion 36 may be extracted from inlet 38 positioned in an early stage of compressor 12 for providing a comparatively cooler, lower pressure excess portion 36 than may be available in a later stage of the compressor. For example, in a compressor 12 having stages numbering 1 through N, consecutively, from a lowest pressure stage to a highest pressure stage, the inlet 38 may be disposed in a stage having a stage number less than N/2. In a 19-stage compressor, the inlet 38 may be disposed in the 6$^{th}$ stage. Extracting excess portion 36 from a lower pressure stage may be desired to minimize the pressure of the excess portion 36 entering the exhaust gas 28. In a retrofit application, the excess portion 36 may be extracted from a preexisting pressure tap, such as a bleed port in the compressor 12, thereby reducing the need for extensive modifications.

The bypass flow path 34 may further include an excess air control valve 40, such as a metering valve, for controlling the amount of excess portion 36 bypassed around the combustor 14 and turbine 16. The excess air control valve 40 may be metered to deliver a controlled amount of excess portion 36 into exhaust gas 28 downstream of the turbine 16 to produce a cooled exhaust 44. Accordingly, cooled exhaust 44 has a higher mass and a lower temperature than does the flow of exhaust gas 28 leaving the turbine 16. The excess air control valve 40 may be responsive to a valve control signal 48 provided by a controller 46. The valve controller 46 may control the excess air control valve 40 in response to temperature measurements provided by temperature sensor 52 for measuring a temperature of the exhaust gas 28 and temperature sensor 50 for measuring a temperature of the cooled exhaust 44. For example, in a retrofit application, an existing gas turbine controller may be modified to incorporate monitoring temperatures of the exhaust gas 28 and cooled exhaust 44 to generate a valve control signal 48 controlling the flow of the excess portion 36 into the exhaust gas 28. In addition, other system parameters that are useful in controlling gas turbine operation, such as temperatures, pressures, or flow rates at other locations throughout the combined cycle plant, may be sensed by the controller 46 to generate a desired flow of excess portion 36 into the exhaust gas 28 via excess air control valve 40. In other retrofit applications, temperature sensor 50 may need to be installed in the flow of cooled exhaust 44 downstream from a point where the excess portion 36 is combined with the exhaust gas 28.

The controller 46 may be further configured to control an amount of fuel provided to the combustor 14 via a fuel metering valve 54. For example, the flow of fuel 22 provided to the combustor 14 may be controlled to achieve a desired combustion condition, such as a desired firing temperature, or air to fuel ratio in the combustor 14. The flow of fuel 22 may be adjusted depending on an amount of excess portion 36 bypassed around the combustor 14 and turbine 16 and the amount of air 30 provided to the combustor 14. In addition, the controller 46 may be configured to control the position of the inlet guides vanes 20, via an inlet guide vanes control signal 58, for example, in conjunction with an amount of excess portion 36 directed around the combustor 12 and turbine 16. In an aspect of the invention, the inlet guide vanes 20 may be fully opened during start initiation, and the position of the vanes 20 adjusted after start initiation according to an amount of excess portion 36 bypassed. Accordingly, a desired operating condition, such as a desired air to fuel ratio in the combustor 14, may be achieved. In yet another aspect, the inlet guide vanes 20 may be controlled in response to the exhaust gas temperature.

Figure 2:
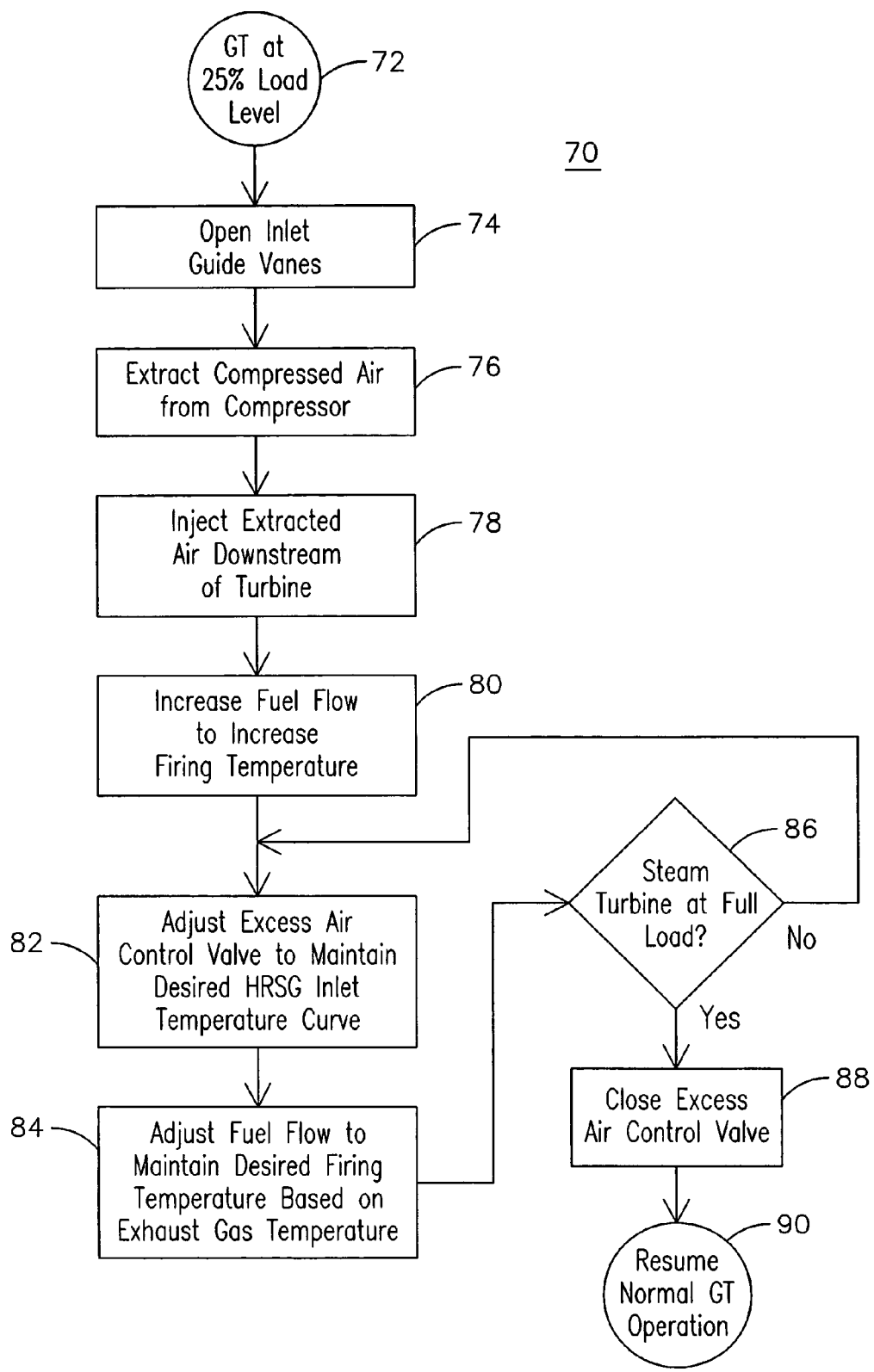
FIG. 2 is a flow chart illustrating a method of opening inlet guide vanes to provide a flow of compressed air directed downstream of the turbine of FIG. 1.

FIG. 2 is a flow chart 70 illustrating an exemplary control method for opening the inlet guide vanes 20 to provide a flow of excess portion 36 directed downstream of the turbine of FIG. 1. In one form, the controller 46 may be configured to perform the actions shown in the flow chart 70. The control method may be initiated when the gas turbine 10 reaches a loading of 25% of a rated base load 72. The inlet guide vanes 20 are opened 74 from their normally closed position to allow a larger volume of air to enter the compressor 12 than is conventionally supplied. For example, the inlet guide vanes 20 may be opened to a maximum opened position, such as 0 degrees with respect to an incoming air flow. Excess portion 36 is then extracted 76 from the compressor 12 and injected 78 downstream of the turbine 16. To maintain a desired firing temperature in the combustor 14, the flow of fuel 22 may be increased 80 in response to an increased volume of air flowing through the combustor as a result of opening the inlet guide vanes 20. The amount of excess portion 36 bypassed around the combustor 14 and turbine 16 may be adjusted 82, for example, in a combined cycle system, to maintain a desired HRSG temperature curve. The flow of fuel 22 is then adjusted to maintain a desired firing temperature responsive to a temperature of the exhaust gas 28, until the steam portion of the turbine 60 is brought up to full load. If the steam turbine portion 60 has not reached full load 86, then the amount of excess portion 36 and the flow of fuel 22 are continually adjusted 82, 84, if required. Once the steam turbine portion 60 has reached full load, the excess air control valve 40 is closed 88 and normal gas turbine 10 operation is resumed 90.

Figure 3:
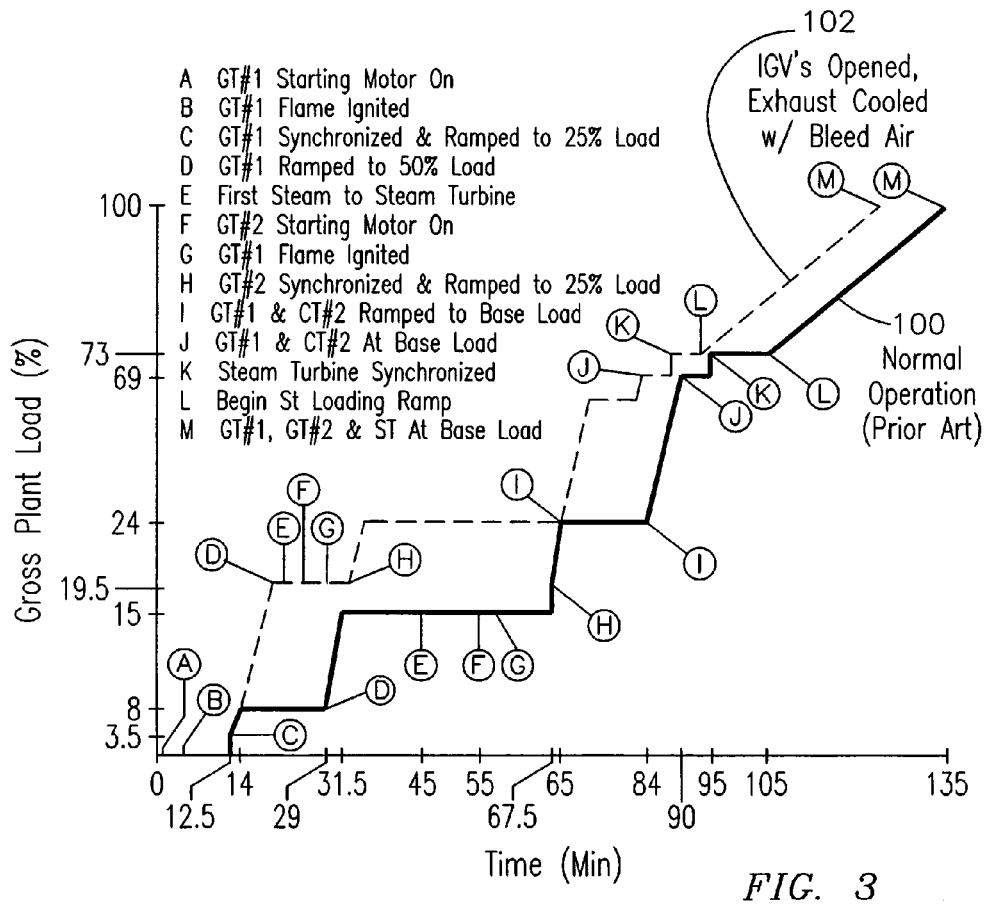
FIG. 3 is a graph illustrating the gross plant load versus time during the startup of a combined cycle power plant both with and without the use of a bypass flow path.

The startup of an exemplary combined cycle power plant having dual gas turbines, GT 1 and GT 2, both with and without the use of an bypass flow path 34, is illustrated in FIG. 3. Curve 100 shows the power output versus time using prior art procedures and equipment, while curve 102 shows power output versus time with the bypass flow path 34 activated and using the procedure described herein. The plant is started from shutdown conditions by first starting GT 1. The power level of GT 1 is increased to a level above that which would otherwise be possible without the use of bypass flow path 34, and preferably is increased as rapidly as possible to a power level where all emissions in the gas turbine exhaust are at their lowest levels or at a desired low level (on a ppm basis) for satisfying emissions regulations. During this time, the temperature of the cooled exhaust 44 into the steam turbine portion 60 is kept within acceptable levels by the relatively cooler excess portion 36. During this period, the excess air control valve 40 is metered to provide an appropriate flow of excess portion 36 to combine with the exhaust gas 28 so that the temperature of the cooled exhaust 44 does not exceed that which is acceptable for warming of an HRSG in the steam turbine portion 60 and that which is used for startup under prior art procedures.

Accordingly, GT 1 and GT 2 may operated at higher loads with correspondingly reduced emissions, sooner than is possible over the prior art (as can be seen by comparing respective operating points at D and J, for example). In the example of FIG. 3, the total plant startup time to full power is reduced from about 95 minutes to about 88 minutes, and the total power generated by the plant during the startup phase is increased by about one quarter (area under the respective curves) with use of the bypass flow path 34. Importantly, the gas turbine portion 12 can be operated at a power level sufficiently high so that the gas turbine exhaust emissions are at a desired low level at or close to their lowest concentration levels measured on a ppm basis. These lower emissions levels allow the operator to satisfy regulatory and contractual emissions commitments, thereby potentially further increasing the revenue generated by the plant and providing a reduced environmental impact.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

We claim as our invention:

1. A gas turbine comprising:
   a compressor producing compressed air;
   a combustor receiving a combustion portion of the compressed air and producing a hot combustion gas;
   a turbine receiving the hot combustion gas and producing an exhaust gas;
   an inlet guide vane upstream of the compressor for controlling a volume of ambient air delivered to the compressor;
   a controller for generating an inlet guide vane control signal to adjust a position of the inlet guide vane for providing a desired volume of ambient air delivered to the compressor that allows the compressor to produce a volume of compressed air exceeding a volume of compressed air needed to support combustion during at least startup; and
   a flow path receiving an excess portion of the compressed air produced by the compressor but not needed to support combustion and conducting the excess portion into the exhaust gas to produce a cooled exhaust gas during at least startup.

2. The gas turbine of claim 1, further comprising a metering valve, responsive to a valve control signal, positioned in the flow path.

3. The gas turbine of claim 2, wherein the controller is further configured for generating the valve control signal responsive to at least one of the group consisting of a temperature of the exhaust gas and a temperature of the cooled exhaust gas.

4. The gas turbine of claim 1, wherein the compressor comprises stages numbering 1 Through N consecutively from a lowest pressure stage to a highest pressure stage, an inlet of the flow path disposed in a stage having a stage number less than N/2.

5. The gas turbine of claim 4, wherein the inlet comprises a pressure tap port on the compressor.

6. The gas turbine of claim 1, wherein the gas turbine is configured to operate at a power level sufficiently high to enable satisfying an emissions regulation while conducting the excess portion into the exhaust gas to produce the cooled exhaust gas.

7. The gas turbine of claim 1, wherein at least a portion of the exhaust gas from the gas turbine is delivered to a downstream steam turbine portion of a plant, the gas turbine being configured to operate at a power level that produces hot exhaust gas at a temperature greater than a temperature desired for warming the steam turbine portion of the plant.

8. The gas turbine of claim 1, wherein the inlet guide vane control signal comprises an instruction to open the inlet guide vane during a start-up period of the gas turbine.

9. A gas turbine having a compressor, a combustor, and a turbine, the gas turbine comprising:
   means for opening an inlet guide vane upstream of the compressor to allow the compressor to produce a volume of compressed air exceeding a volume of compressed air needed to support combustion during at least startup;
   means for extracting an excess portion of the compressed air produced but not needed to support combustion; and
   means for combining the excess portion with an exhaust gas generated by the turbine to produce a cooled exhaust gas during at least startup.

10. The gas turbine of claim 9, wherein the gas turbine is configured to operate at a power level sufficiently high to enable satisfying an emissions regulation while combining the excess portion with the exhaust gas.

11. The gas turbine of claim 9, wherein means for opening the inlet guide vane is operable in response to a temperature of the cooled exhaust gas.

12. The gas turbine of claim 9, further comprising means for controlling a flow rate of the excess portion.

13. The gas turbine of claim 12, wherein means for controlling a flow rate of the excess portion is operable in response to one of the group consisting of a temperature of the exhaust gas and a temperature of the cooled exhaust gas.

14. A gas turbine comprising:
   a compressor producing compressed air;
   a combustor receiving a combustion portion of the compressed air and producing a hot combustion gas;
   a turbine receiving the hot combustion gas and producing an exhaust gas for delivery to a downstream steam turbine;
   an inlet guide vane upstream of the compressor for controlling a volume of ambient air delivered to the compressor;
   a controller for generating an inlet guide vane control signal to open the inlet guide vane for providing an increased volume of ambient air delivered to the compressor during at least startup that allows the compressor to produce an air volume inexcess of what is needed to sustain combustion at a power level of the gas turbine that produces hot exhaust gas at a temperature for warming a downstream steam turbine portion of a plant; and a flow path for receiving an excess portion of the compressed air produced by the compressor but not needed to sustain combustion at the power level and for conducting the excess portion into the exhaust gas during at least startup to produce a cooled exhaust gas for delivery to the downstream steam turbine portion of the plant.

15. The gas turbine of claim 14, further comprising operating the gas turbine at a power level sufficiently high to enable satisfying an emissions regulation while conducting the excess portion into the exhaust gas to produce the cooled exhaust gas.

16. The gas turbine of claim 14, further comprising a metering valve, responsive to a valve control signal, positioned in the flow path.

17. The gas turbine of claim 16, wherein the controller is further configured for generating the valve control signal responsive to at least one of the group of a temperature of the exhaust gas and a temperature of the cooled exhaust gas.

18. The gas turbine of claim 14, wherein the compressor comprises stages numbering 1 Through N consecutively from a lowest pressure stage to a highest pressure stage, an inlet of the flow path disposed in a stage having a stage number less than N/2.

19. The gas turbine of claim 18, wherein the inlet comprises a pressure tap port on the compressor.

* * * * *